United States Patent [19]

Roy et al.

[11] Patent Number: 4,930,731

[45] Date of Patent: Jun. 5, 1990

[54] DOME AND WINDOW FOR MISSILES AND LAUNCH TUBES WITH HIGH ULTRAVIOLET TRANSMITTANCE

[75] Inventors: Donald W. Roy, Golden; James L. Hastert, Lakewood, both of Colo.

[73] Assignee: Coors Porcelain Company, Golden, Colo.

[21] Appl. No.: 363,355

[22] Filed: Jun. 2, 1989

Related U.S. Application Data

[63] Continuation of Ser. No. 47,422, May 6, 1987, abandoned.

[51] Int. Cl.[5] .................. F41G 7/26; F42C 19/04; B29D 11/00; C04B 35/62
[52] U.S. Cl. ................... 244/316; 89/1.817; 102/293; 264/12; 501/120
[58] Field of Search ............... 89/1.816, 1.817, 1.818; 102/293; 244/3.16; 65/18.1; 106/286.5, 287.17; 264/1.1, 1.2, 2.6, 56, 64, 65; 423/600; 501/118-120

[56] References Cited

U.S. PATENT DOCUMENTS

| | | | |
|---|---|---|---|
| 3,026,210 | 3/1962 | Coble | 106/39 |
| 3,186,906 | 6/1974 | Falckenberg . | |
| 3,239,322 | 3/1966 | Carter . | |
| 3,294,878 | 12/1966 | Carnall, Jr. et al. | 264/1 |
| 3,392,056 | 7/1968 | Maskalick . | |
| 3,431,326 | 3/1969 | Letter | 264/1 |
| 3,530,209 | 9/1970 | Ho | 264/65 |
| 3,531,308 | 9/1970 | Rangley | 106/62 |
| 3,556,843 | 1/1971 | Buck | 117/227 |
| 3,589,880 | 6/1971 | Clark | 65/18 |
| 3,676,211 | 7/1972 | Kourtesis . | |
| 3,768,990 | 10/1973 | Sellers et al. | 65/18 |
| 3,853,973 | 12/1974 | Hardtl et al. | 264/65 |
| 3,875,277 | 4/1975 | Bratton et al. | 264/65 |
| 3,950,504 | 4/1976 | Belding et al. | 423/600 |
| 3,974,249 | 8/1976 | Roy et al. | 264/65 |
| 4,009,042 | 2/1977 | Rittler | 106/39.7 |
| 4,047,960 | 9/1977 | Reade | 106/39.8 |
| 4,049,582 | 9/1977 | Erickson et al. . | |
| 4,056,457 | 11/1977 | Vossen, Jr. . | |
| 4,066,481 | 1/1978 | Manasevit et al. . | |
| 4,078,711 | 3/1978 | Bell et al. . | |
| 4,146,379 | 3/1979 | Copley et al. . | |
| 4,147,584 | 4/1979 | Garrison et al. . | |
| 4,171,400 | 10/1979 | Rosette et al. | 428/357 |
| 4,191,577 | 3/1980 | Buescher et al. . | |
| 4,263,374 | 4/1981 | Glass et al. . | |
| 4,269,651 | 5/1981 | Glass et al. . | |

(List continued on next page.)

OTHER PUBLICATIONS

R. J. Bratton & S. M. Ho, "MgAl$_2$O$_4$ Fibers and Platelets," *Journal of the American Ceramic Society*, vol. 51, No. 1, pp. 56-57, (1968).

R. J. Bratton, "Coprecipitates Yielding MgAl$_2$O$_4$ Spinel (List continued on next page.)

*Primary Examiner*—Charles T. Jordan
*Assistant Examiner*—Michael J. Carone
*Attorney, Agent, or Firm*—Sheridan, Ross & McIntosh

[57] ABSTRACT

A dome and window for missiles and launch tubes is provided having high ultraviolet transmittance and high strength properties. The domes and windows have, in their uncoated state, and with a thickness of about 1.88 mm, a transmittance greater than about 80%, preferably greater than about 82%, and more preferably greater than about 85%, at a wavelength of 0.4 microns to 0.5 microns. The domes and windows preferably have a transmittance per 1.88 mm thickness at all wavelengths in the wavelength range between 3.0 microns and 4.0 microns of at least about 81%. The domes and windows have a flexural strength of at least about 20,000 psi and a knoop hardness of at least about 1350 kg mm$^{-2}$. The domes and windows are formed of a transparent, sintered polycrystalline magnesia-alumina spinel. The polycrystalline sintered spinel is formed in a two-step process comprising forming a closed porosity body such as by hot-pressing or pressureless sintering followed by a hot isostatic pressure treatment step to reduce residual porosity to less than about 0.001 percent.

10 Claims, 5 Drawing Sheets

U.S. PATENT DOCUMENTS

| | | |
|---|---|---|
| 4,273,587 | 1/1981 | Oda et al. ............................ 106/73.4 |
| 4,296,065 | 10/1981 | Ishii et al. ............................ 264/325 |
| 4,304,461 | 12/1981 | Stewart et al. . |
| 4,316,936 | 2/1982 | Hing . |
| 4,347,210 | 8/1982 | Maguire et al. ...................... 264/294 |
| 4,401,767 | 7/1983 | Dietz et al. . |
| 4,412,963 | 11/1983 | Hing . |
| 4,436,785 | 3/1984 | Dietz et al. . |
| 4,459,166 | 7/1984 | Dietz et al. . |
| 4,461,750 | 7/1984 | Chess et al. ......................... 423/263 |
| 4,471,026 | 9/1984 | Nicolas et al. . |
| 4,488,673 | 12/1984 | Hopper, Jr. . |
| 4,520,116 | 5/1985 | Gentilman et al. .................... 501/98 |
| 4,524,138 | 6/1985 | Schwetz et al. ....................... 501/90 |
| 4,535,029 | 8/1985 | Intrater et al. . |
| 4,543,346 | 9/1985 | Matsui et al. . |
| 4,584,151 | 4/1986 | Matsui et al. . |
| 4,585,972 | 4/1986 | Hing . |
| 4,587,225 | 5/1986 | Tsukuma et al. .................... 501/105 |
| 4,600,658 | 7/1986 | Anderson et al. . |
| 4,604,299 | 8/1986 | De Luca et al. . |
| 4,701,352 | 10/1987 | De Luca et al. . |

OTHER PUBLICATIONS

Powders," *Ceramic Bulletin*, vol. 48, No. 8, pp. 759–762, (1969).

R. J. Bratton, "Characterization and Sintering of Reactive MgAl$_2$O$_4$ Spinel," Ceramic Bulletin, vol. 48, No. 11, pp. 1069–1075, (1969).

R. J. Bratton et al., "Densification Phenomena in the Hot-Pressing of Spinel," *Journal of Materials Science*, vol. 7, pp. 1363–1368, (1972).

R. J. Bratton, "Translucent Sintered MgAl$_2$O$_4$," *Journal of the American Ceramic Society*, vol. 57, No. 7, pp. 283–286, (1974).

"A Reconsideration of Stress and Other Factors in the Kinetics of Densification," *Kinetics of Reactions in Ionic Systems*, pp. 392–407, (1969), H. Palmour, III et al.

James R. Floyd, "Effect of Composition and Crystal Size of Alumina Ceramics on Metal-to-Ceramic Bond Strength," Ceramic Bulletin, vol. 42, No. 2, pp. 65–76.

"Joining of Ceramic-Metal Systems: General Survey," Encyclopedia of Material Science and Engineering, Michael B. Bever, ed., pp. 2463–2475 at 2470.

R. Gentilman et al., Raytheon Company, Research Division, Waltham, MA, 02154, "High Durability Missile Domes," Interim Technical Report for Period One, Oct. 1977 through 30 Sep. 1978.

"ASRAAM Development," International Defense Review, vol. 7, pp. 1171–1172, (1985).

M. D. Herr et al., "Evaluation of a Statistical Fracture Criteria for Magnesium Fluoride Seeker Domes," Naval Weapons Center, N.W.C. Technical Publication 6226, (1980).

M. E. Thomas et al., "Infrared Transmission Properties of Sapphire, Spinel, and Yttria as a Function of Temperature," SPIE, vol. 683, pp. 41–48, (1986).

J. A. Cox et al., "Comparative Study of Advanced IR Transmissive Materials," SPIE, vol. 683, (1986).

R. L. Gentilman, "Current and Emerging Materials for 3–5 Micron IR Transmission," SPIE, vol. 683, pp. 2–11, (1986).

P. C. Archibald et al., "Optical Measurements on Advanced Performance Domes," SPIE, vol. 505, (1984).

"Techbits," vol. 66-2, pp. 11–14, Kodak Periodical, p–3, pp. 11–12, (1966).

"Transparent MgAl$_2$O$_4$ Spinel, A Broad Band Window Material for Fuzes and Guidance Systems," Roy et al.

R. Lopez, "How the Hardware is Progressing," International Defense Review, vol. 1, pp. 84–85, (1986).

"Stinger," Air Defense Artillery Magazine, Issue 1, p. 33, (1985).

P. C. Archibald et al., "Scattering From Infrared Missile Domes," SPIE, vol. 133, pp. 71–75, (1978).

G. W. Ewing, Instrumental Methods of Chemical Analysis, 3rd ed., p. 8, McGraw-Hill Book Co.

"Ultraviolet Radiation", Van Nostrands' Scientific Encyclopedia, 4th ed., pp. 1908–1909.

M. W. Benecke et al., "Effect of LiF on Hot-Pressing of MgO," Journal of the American Ceramic Society, vol. 50, No. 7, pp. 365–368.

M. Hirota, "X-Ray Studies on the Reaction Product formed in the Metallized Layer-Ceramic Interface of Metal-to-Ceramic Seal," Transactions-Japanese Institute of Metals, vol. 9, pp. 266–272, (1986).

"Metallizing for Ceramics," Ceramic Industry-Japan, p. 7, (Jan. 1988).

"Metallizing," Advanced Ceramics Report, p. 2, (1986).

W. J. Tomlinson, "Low Temperature Metallization of (List continued on next page.)

OTHER PUBLICATIONS

Debased Alumina," Surface and Coatings Technology, vol. 27, pp. 23–28, (1986).

C. A. Calow et al., "The Solid State Bonding of Nickel to Alumna," Journal of Material Science, vol. 6, pp. 156–163 at 159, (1971).

"Technology Update," Ceramic Bulletin, vol. 67, No. 1, p. 64, (1988).

J. E. McDonald et al., "Adhesion In Aluminum Oxide—Metal Systems," Transactions of the Metallurgical Society of AIME, vol. 233, pp. 512–517, (1965).

Encyclopedia for Material Science and Engineering, vol. 1, Bever ed., pp. 584–587, 595–611.

Kohno et al., "Metallization of Non-Oxide Ceramics," British Ceramic Proceedings, vol. 37, pp. 125–130, (1968).

Morozumi et al., "Bonding Mechanism Between Alumina and Niobium," Journal of Materials Science, vol. 16, pp. 2137–2144,(1981).

Roy, "Development of Hot-Pressed Spinel for Mutispectral Windows and Domes", AFWAL-TR-8-1-4005, 3-81, pp. 1–65.

Gatti, "Development of a Process for Producing Transparent Spinel Bodies", Final Report: Contract N00019-69-C-0133, Sep. 1969.

Gatti et al. "Development of a Process for Producing Transparent Spinel Bodies", Final Report: Contract N00019-17-C-0126, Dec. 1971, MIL-0-13830, pp. 32–34.

Palmour, "Development of Polycrystalline Spinel for Transparent Armor Applications", AMMRC CTR 724.

Roy et al. "Polycrystalline $MgAl_2O_4$ Spinel for use as Windows and Domes from 0.3 to 6.0 Microns".

Gentilman, "Fusion-Casting of Transparent Spinel", 60 American Ceramic Society Bulletin 906 (1981).

C. Lacour, Relationship Between Thermochemical Treatment and Transparency of $MgAl_2O_4$ Prepared from Freeze-Dried Liquid Solutions, Science of Sintering, vol. 12, No. 1, pp. 39–48.

Strobel, Forrest A. "Thermostructural Evaluation of Spinel Infrared (IR) Domes", Emerging Optical Materials S.P.I.E., vol. 297, pp. 125–136.

"Ambient Strength and Fracture Behavior of $MgAl_2O_4$", Rice et al., Mechanical Behavior of Materials, 1971 International Conference, vol. IV, pp. 422–431.

Musikaut, Solomon, "Development of a New Family of Improved Infrared (IR) Dome Ceramics", Emerging Optical Materials, S.P.I.E., vol. 297, pp. 2–12.

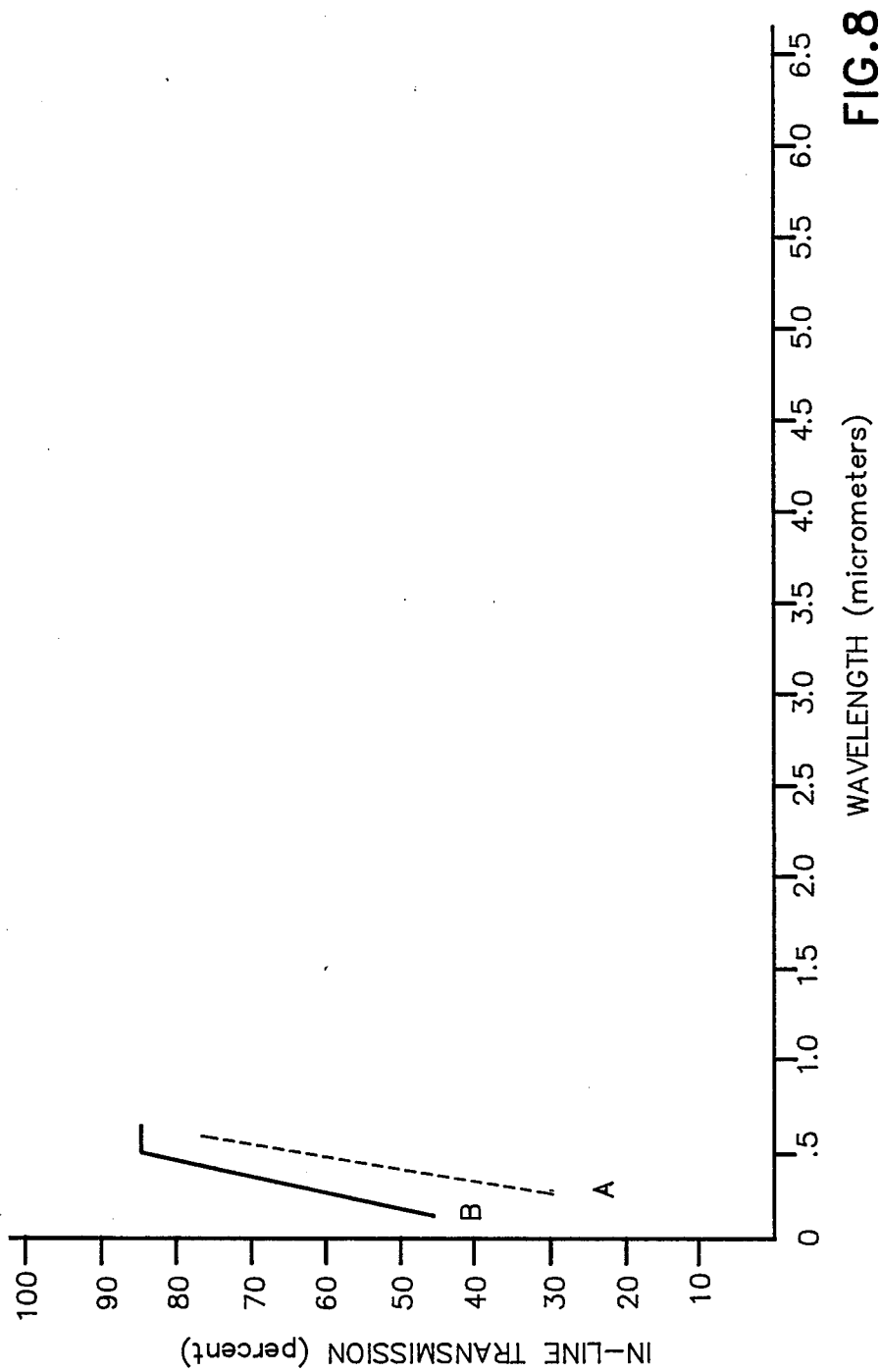

DOME AND WINDOW FOR MISSILES AND LAUNCH TUBES WITH HIGH ULTRAVIOLET TRANSMITTANCE

This is a continuation of co-pending application Ser. No. 07/047,422 filed on May 6, 1987 now abandoned.

FIELD OF THE INVENTION

The present invention relates to missiles and missile launch tubes and certain components used therewith and, in particular, to a missile dome and a launch tube window having high ultraviolet transmittance properties.

BACKGROUND OF THE INVENTION

A number of missiles and missile-related hardware items use transparent dome or window components. For example, the missile uses a dome component which acts as a port for radiation sensing instruments such as infrared sensors or ultraviolet sensors. The missile is commonly launched from a launch tube which includes a sealing window intended to rupture upon launch but which should be transparent to infrared or ultraviolet radiation. Materials used in the past for such domes and windows, particularly MgF$_2$, have a degree of transmittance in the infrared region, but are somewhat deficient in transmittance in ultraviolet wavelengths. Additionally, MgF$_2$ is, for some purposes, somewhat deficient in certain mechanical properties. In this regard, MgF$_2$ domes and launch windows have a knoop hardness of about 576 kg mm$^{-2}$ and a flexural strength of about 12.5 kpsi.

A material for a launch tube window or a missile dome preferably is also relatively stable under conditions of high temperature, corrosive environments, such as oxidizing environments, or acidic environments, is substantially insoluble in water, can be polished to a high degree of polish, is stable under prolonged exposure to ultraviolet light, and is resistant to abrasion or erosion, particularly when subjected to dust, sand, or water droplets at a velocity of about 500 meters per second Launch tube windows have an additional constraint in that the launch tube window should have sufficient strength and hardness to retain its integrity and transparency during ordinary storage and transport conditions, but which will rupture at a desired overpressure level, so that the window will disintegrate during launch of the missile.

Materials which have been used for producing a transparent body include metal fluorides, particularly magnesium fluoride (U.S. Pat. No. 3,589,880 issued June 29, 1971 to Clark; U.S. Pat. No. 3,294,878 issued Dec. 27, 1966 to Carnall, Jr., et al.; U.S. Pat. No. 3,431,326 issued Mar. 4, 1969 to Letter), aluminum oxynitride (U.S. Pat. No. 4,520,116 issued May 28, 1985 to Gentilman, et al.), aluminum niobate or tantalate (U.S. Pat. No. 4,047,960 issued Sept. 13, 1977 to Reade), and solid solutions of alumina, silica and other oxides (U.S. Pat. No. 4,009,042 issued Feb. 22, 1977 to Wittler) and alumina, with minor amounts of spinel (U.S. Pat. No. 3,026,210 issued Mar. 20, 1962 to Coble).

Previous methods of ceramic preparation which have included a hot-press or closed-porosity step followed by a hot isostatic press step have included U.S. Pat. No. 4,461,750 issued July 24, 1984 to Chess, et al., U.S. Pat. No. 4,524,138 issued June 18, 1985 to Schwetz, et al., and U.S. Pat. No. 3,853,973 issued Dec. 10, 1974 to Hardtl, et al.

Methods have also been developed for production of transparent bodies substantially from a magnesia-alumina spinel. U.S. Pat. No. 3,974,249 issued Aug. 10, 1976 to Roy, et al., U.S. Pat. No. 768,990 issued Oct. 30, 1973 to Sellers, et al., U.S. Pat. No. 3,531,308 issued Sept. 29, 1970 to Bagley. Polycrystalline bodies of spinel are, in general, more easily formed than single-crystal or fusion-cast spinel or sapphire.

Previous materials and methods for production of a sintered transparent body have suffered from a number of difficulties. These materials have been deficient in transmittance in certain wavelength ranges, particularly ultraviolet ranges, for example, wavelengths from about 0.2 micrometers (microns) to about 0.4 microns, as well as visible and infrared wavelengths up to about 6 microns.

Previous materials were susceptible to abrasion or erosion, for example, from high velocity impaction of dust or sand particles or rain or cloud droplets.

Previous materials were often unstable under conditions of long exposure to ultraviolet light, such that exposure to sunlight or to ultraviolet light with an intensity of about 700 microwatts/cm$^2$, on the order of 0.25 hours or more caused a reduction of the transmittance properties of the material.

Previous materials have been difficult to form with the desired structural strength. In some applications it is desired to produce a transparent window which can withstand mechanical stress on the order of a pressure of about 15 psi (0.1 MPa), but which will preferably rupture when subjected to a pressure of about 25 psi (0.17 MPa) or more.

Certain previous materials, e.g. MgO, are hygroscopic and become cloudy upon exposure to moisture, rendering the optical qualities of the material unacceptable.

Previous production methods have been costly to practice and have required a number of difficult steps making the windows impractical to produce in quantity.

Accordingly, there is a need for material which displays good ultraviolet transmittance, possesses elevated strength and hardness characteristics, and is resistant to erosion, thermal or chemical degradation, and the like.

SUMMARY OF THE INVENTION

According to the present invention, a missile dome or launch tube window is provided having a high in-line transmittance in the ultraviolet wavelength region and having desired strength and hardness characteristics. The body preferably comprises magnesia-alumina spinel. The body preferably has, in its uncoated state and with a thickness of about 1.88 millimeters, a transmittance greater than about 80 percent, preferably greater than about 82 percent, and preferably greater than about 85 percent at a wavelength of 0.4 microns to 0.5 microns. The body preferably has, in its uncoated state and with a thickness of about 1.88 millimeters, a transmittance greater than about 84.5 percent, preferably greater than about 85 percent, more preferably greater than about 86 percent, in the wavelength range between 0.5 microns and 1.0 microns. The body preferably has a transmittance, in its uncoated state and with a thickness of about 1.88 millimeters, a transmittance greater than about 78 percent, preferably greater than about 81 percent, more preferably greater than about 83 percent, at all wavelengths in the wavelength range from about 3 microns to about 4 microns and a transmittance greater than about 50 percent, preferably greater than about 76 percent, at a wavelength between 4 microns and 5 microns.

The material retains at least about 90 percent and preferably at least about 99 percent of its original transmissivity after as much as 240 hours or more of exposure to ultraviolet light of a wave length between about 0.2 and about 0.4 microns. The sintered body has a flexural strength of at least about 15,000 psi (about 100 MPa) and preferably at least about 20,000 psi (about 140 MPa), most preferably at least about 28,000 psi (about 200 MPa).

The sintered transparent body is produced by a two-step process involving forming a closed porosity body in a first step and reducing residual porosity in a second step. The method comprises forming a powder, preferably of spinel, and preferably having less than 0.005 weight percent of certain impurities. The powder is formed into a closed porosity body. The closed porosity body can be formed by, e.g., hot pressing or pressureless sintering. The closed porosity body is then hot isostatic pressed at a temperature of at least about 1400° C. under a pressure of at least about 15,000 psi (about 100 MPa). The sintered body produced by this method has a porosity less than about 0.001 percent.

A transparent spinel and method of producing are disclosed in copending U.S. Pat. applications respectively titled "Transparent Polycrystalline Body With High Ultraviolet Transmittance", Ser. No. 047,403, filed May 6, 1987 and "Method for Producing Transparent Polycrystalline Body With High Ultraviolet Transmittance", Ser. No. 047,428, filed May 6, 1987.

BRIEF DESCRIPTION OF THE FIGURES

FIG. 8 illustrates a preferred and a more preferred in-line transmission of polycrystalline bodies made according to the present invention;

DETAILED DESCRIPTION OF THE PREFERRED EMBODIMENTS

Figure 9:
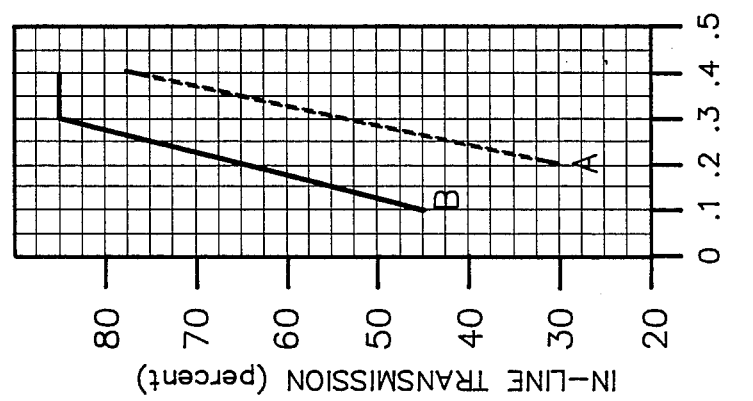
FIG. 9 depicts the transmission curves of FIG. 8 in greater detail.

According to the present invention, there is provided a missile dome and a launch tube window comprised of a sintered polycrystalline magnesia-alumina spinel body which is highly transparent, particularly in the ultraviolet region between about 0.2 microns and about 0.4 microns wavelength. The domes and windows produced according to the present invention have an inline transmittance greater than or equal to the transmittance depicted by Line A in FIGS. 8 and 9.

Figure 12:
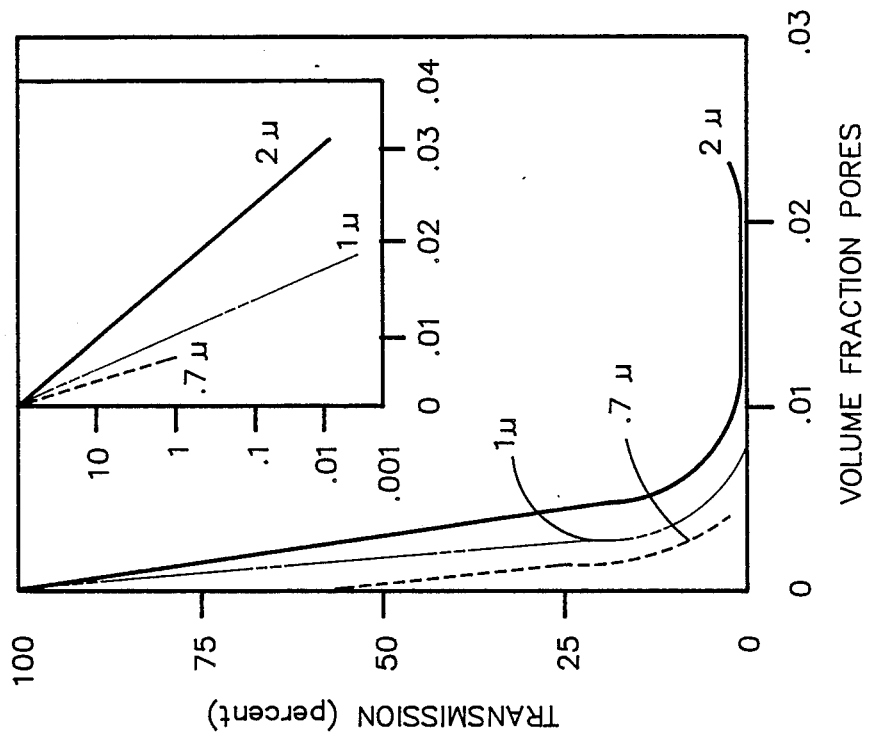
FIG. 12 illustrates a relationship between optical transmission and porosity used to obtain porosity from measurements of optical transmission.

The domes and windows produced according to the present invention comprise spinel and preferably contain more than about 99.9 weight percent spinel. Spinel is a useful material for optical applications such as instrument parts because, among other reasons, spinel is non-birefringent, has a cubic structure and is substantially non-hygroscopic. The domes and windows have a porosity of less than 0.01 percent, preferably less than 0.001 percent by volume and an average pore size less than about 0.1 microns. Porosity in such low range is difficult to measure by ordinary displacement methods. Porosity can be measured using electron micrographs of the sintered body. Another method of determining porosity is to calculate porosity from measured light transmittance, e.g. by using the graphical relationship depicted in FIG. 12, which applies generally to material such as the material which is the subject of this invention.

The domes and windows of the present invention have a scatter of less than about $9 \times 10^{-3}$, preferably less than about $8 \times 10^{-3}$, and most preferably less than $7 \times 10^{-3}$ at a wave length of about 0.6471 microns. The domes and windows can be polished to a scratch-dig size of less than about 20—20. The scratch-dig size of 20—20 represents a maximum scratch size of 0.020 mm (0.0008 inches) in width and a maximum dig size of 0.20 mm (0.008 inches) in diameter. In this context, a scratch is a defect which is long and thin in nature and a dig is a defect which is basically round. The meaning of scratch-dig size is explained fully in Mil-0-13830, pp. 32-34, incorporated herein by reference.

The sintered body has an average grain size less than about 150 microns. The sintered body has an average defect radius of less than about 0.005 inches (about 0.12 mm).

The domes and windows of the present invention provide a relatively low emissivity in the infrared wavelength regions at elevated temperatures. High emissivities interfere with optics measurements and can be detrimental to optical guidance systems such as situations in which missile nose cones are aerodynamically heated during flight. Table 1 provides a comparison of emissivities of hot-pressed spinel with those of sapphire at various temperatures. Although the hot-pressed spinel represented in Table 1 is not made according to the claimed invention, since emissivities are primarily material-dependent, it is believed emissivities of spinel material made in accordance with the present invention has emissivities no greater than about those shown in Table 1 for hot-pressed spinel.

TABLE 1

| | Emissivity at 4.5 and 5.0 Microns | | | |
|---|---|---|---|---|
| Temp. | Emissivity at 4.5 microns | | Emissivity at 5.0 microns | |
| (°C.) | spinel | sapphire | spinel | sapphire |
| 30 | 0.078 | 0.051 | 0.157 | 0.199 |
| 200 | 0.091 | 0.074 | 0.203 | 0.268 |
| 400 | 0.118 | 0.119 | 0.280 | 0.370 |
| 600 | 0.151 | 0.168 | 0.361 | 0.477 |
| 800 | 0.194 | 0.229 | 0.461 | 0.587 |
| 1000 | 0.247 | 0.311 | 0.559 | 0.686 |
| 1200 | 0.303 | 0.381 | 0.664 | 0.777 |
| 1400 | 0.381 | 0.468 | 0.788 | 0.848 |

The domes and windows of the present invention have a flexural strength, measured according to the ASTM F417 test, measured at 25° C., of at least about 15,000 psi (100 MPa), preferably at least about 20,000 psi (140 MPa), and most preferably at least about 23,000 psi (about (160 MPa). The domes and windows have a tensile strength, measured according to the ACMA #4 test of at least about 12,000 psi (about 80 MPa). The material, however, is not so strong that it will resist bursting at a desired level. The windows of the present invention, when provided in a 3 inch (7.5 cm) diameter disk having a thickness of about 0.06 inches (1.5 mm), burst when subjected to a pressure of more than about 25 psi (about 0.17 MPa).

The domes and windows of the present invention are resistant to abrasion or erosion, and particularly, when subjected to dust, sand or water droplets at a velocity of about 500 meters per second, undergo substantially no degradation of transmittance properties. The domes and windows of the present invention have a Knoop hardness, measured according to the ASTM E18 test of greater than 1350 kg mm$^{-2}$.

The domes and windows of the present invention are resistant to degradation under high temperature conditions and, in particular, have a high melting point, above 2000° C.

The domes and windows of the present invention are stable under exposure to ultraviolet light, and particularly, experience a loss of transmissivity of less than about 1 percent after being subjected to sunlight or to ultraviolet radiation of an intensity of about 700 microwatts/cm$^2$ having a wave length of about 0.254 microns for about 240 hours.

The domes and windows of the present invention are chemically and thermally stable. The polycrystalline material of the present invention has a solubility of less than $10^{-3}$ g/100 g water at room temperature. The domes and windows have substantially no solubility in an acidic aqueous solution having a pH of between about 7 and about 2. There is substantially no degradation of the body upon exposure to oxidizing materials and there is substantially no degradation of the body upon exposure to temperatures of about 500° C. In this context, substantially no degradation means that the strength, hardness and optical qualities of the material are substantially preserved. In particular, upon exposure to oxidizing or to temperatures of about 500° C., the body possesses a knoop hardness of at least about 1038 kg mm$^{-2}$ a flexural strength of at least about 1500 psi, and in-line transmittance per 1.88 mm thickness in all wavelengths in the wavelength range from about 0.2 microns to about 0.4 microns of not less than the transmittance shown by Line A in FIG. 9.

For comparison purposes, Table 2 shows a number of physical properties reported for other optical materials.

TABLE 2

| | 4-point Flexural Strength (MPa) | Knoop Hardness 20° C. (kg/mm2) | Fracture Strength (MPa) | 550–450° C. Resistance to Thermal Stress (K/E) | 750° C. Resistance to Thermal Shock (w/cm) | Tensile Strength (MPa) | Thermal Conductivity (10-4 cal./ cm sec °C.) | Melting or Softening Temperature (°C.) |
|---|---|---|---|---|---|---|---|---|
| Previous hot-pressed spinel | 103 | 1390 | 193 | 11 | 10 | 110 | 330 | 2135 |
| MgF2 | 100 | 576 | 151 | 3.2 | 9 | | | 1255 |
| MgO | 140 | 900 | 158 | 8 | 11 | | 600 | 2800 |
| Al2O3 | | 2200 | 344 | 21 | | | 600 | 2030 |
| Y2O3 | 160 | 800 | 193 | 7 | | | | |
| ZnS | | 356 | 103 | 6 | | | | |
| Fusion-cast spinel | 175 | 1750 | | | | | | |
| Alpha Si3N4 | | 2400 | | | | | | |
| AlON | 305 | 1950 | 206 | | | | | 2140 |
| Germinate glass | | 460 | | | | | | |

The method preferred for producing the domes and windows will now be described. According to the method of the present invention, a magnesia-alumina spinel powder is provided. The spinel powder is of high purity, and particularly, has less than about 5 ppm by weight, preferably less than 3 ppm, of oxides of any of the following elements: Cr, Cu, Fe, Ga, Mn, Pb, Ti, V, Zn, and has less than 50 ppm, preferably less than 30 ppm of the total of all the above oxides. The powder preferably has less than 1,000 ppm, preferably less than 10 ppm of carbon, less than 10 ppm, preferably less than 5 ppm of calcium, less than 30 ppm, preferably less than 5 ppm of sodium, less than 500 ppm, preferably less than 100 ppm of sulfur, less than 1,000 ppm, preferably less than 50 ppm of silicon.

Figure 11:
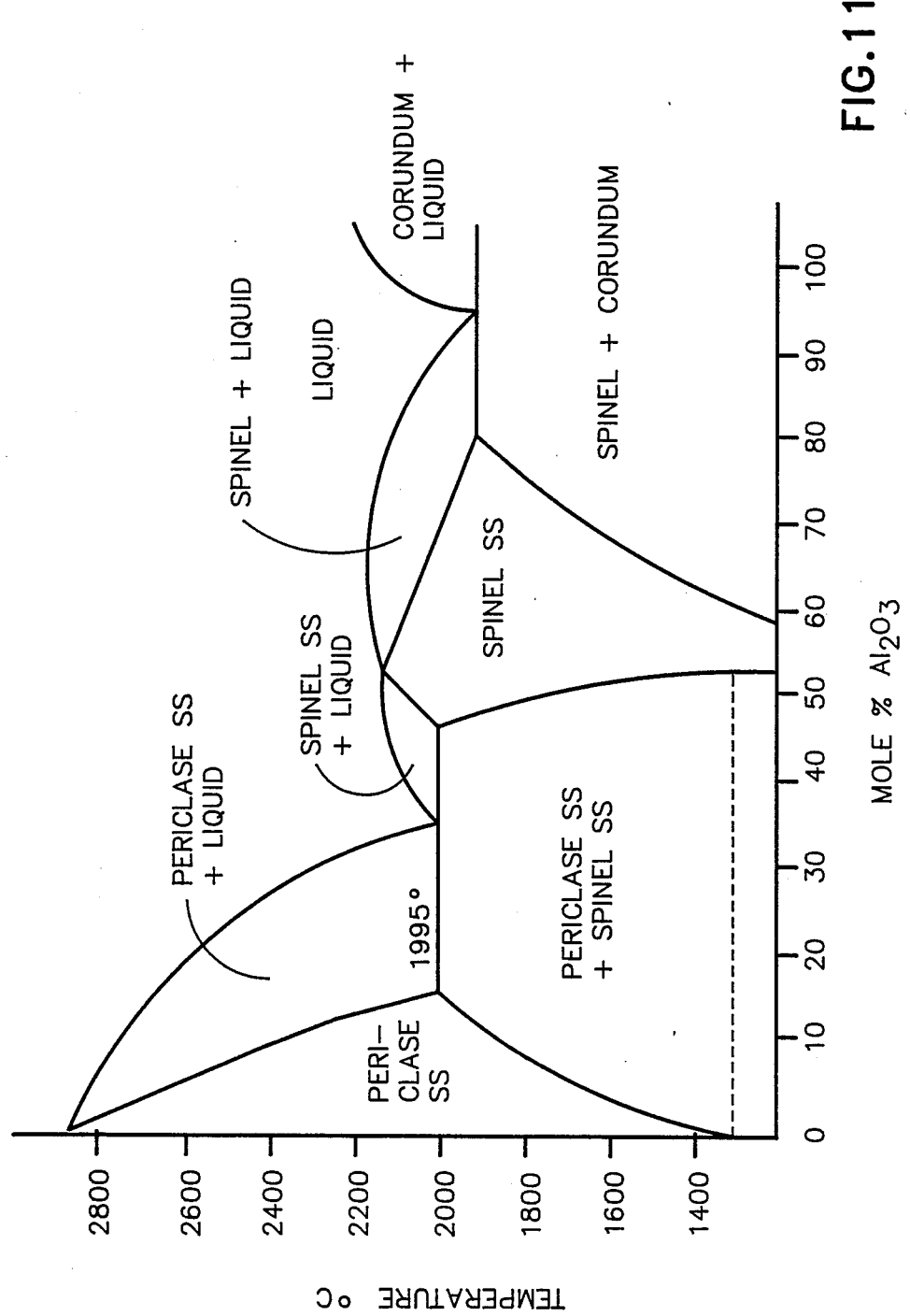
FIG. 11 depicts a phase diagram for the $MgO-Al_2O_3$-spinel system.

The magnesia-alumina powder is a mixture of a powder of MgO and a powder of Al$_2$O$_3$. The mixture can be in any weight ratio of Al$_2$O$_3$ to MgO approximately falling in the range indicated by I in FIG. 11. Preferably, the ratio of Al$_2$O$_3$ to MgO in the powder is about 1:1 plus or minus about 5 mole percent. The powder preferably has a surface area of between about 15 and about 25 m$^2$/g. The average particle size of the powder is substantially submicron and preferably between 40 and 50 weight percent of the particles have a diameter less than about 1 micron.

The powder is used to form a closed porosity body. The formation of a closed porosity body can be accomplished by hot pressing or pressureless sintering. According to the hot pressing method, the powder is mixed with an amount of hot-pressing aid, e.g., between about 0.5 weight percent and about 3 weight percent, preferably about 1 ½ weight percent of LiF.

The mixed powder is loaded in a hot press die. The powder compacts substantially upon pressing. The thickness desired for the hot pressed parts preferably will include an allowance for grinding. For example, a finished 0.3 inch (8 mm) thick disk may require the addition of about 0.015 inch (about 0.3 mm) for grind allowance.

The hot press die may be made of graphite, for example, in the form of a cylindrical annulus. A cylindrical bottom die is placed in the bottom of the hot press die. All surfaces of the dies which will be exposed to the spinel are coated with a graphite foil.

According to one method of hot pressing, a single window is produced for each hot pressing operation. According to another hot pressing method, a number of windows are hot pressed simultaneously such as by vertically stacking two or more layers of spinel powder; separated by a parting medium such as graphite or boron nitride. When several windows are hot pressed simultaneously, the spinel layers are preferably separated by graphite spacers sufficiently thick to prevent fracture of the spacers. Spacers of about ½ inch (1.2 cm) thickness are operable, although thinner spacers may also be operable. Products can be produced in a number of shapes including disks and domes.

After the powder and any parting medium is placed into the die, a top punch is placed into the top of the die. For disks, the top punch is a cylindricallyshaped punch and for domes, the top punch is preferably a male punch.

The prepared and filled die is cold pressed at about 100 psi (0.7 MPa). The cold-press pressure must be sufficient to provide for ease of handling and also assists in slightly compacting the powder prior to placing the die in the main press. The cold press pressure must not, however, be so high that closed porosity results.

The cold-pressed body can be treated to fully or partially remove impurities such as conducting a vacuum bake at about 1100° C. to 1300° C., preferably about 1200° C., to remove volatile impurities. Alternatively, the impurities can be removed during the step of forming closed porosity.

After cold pressing, the die is placed in a quartz cylinder, separated therefrom by an insulating material such as graphite felt. The cold pressed bodies in the die are then subjected to hot pressing. The hot press step can be achieved in an inert gas atmosphere, but is preferably conducted under a vacuum. The actual vacuum which is achieved during hot pressing will depend in part upon the rate at which impurities or other materials out-gas. Apparatus capable of producing about 60 microns of vacuum will suffice. Note that in the discussion that follows with regard to the hot press step, the temperatures are those measured at the top surface of the die by a direct optical method. These temperatures are not necessarily equal to the temperatures of the spinel. Before any pressure is applied, the die is first heated to about 1125° C. Heating is preferably achieved by an induction heating method. The spinel is held at about 1125° C. for about 30 minutes. The pressure and temperature are then both linearly increased over a period of about 1 to 5 hours. The rate of temperature rise and the rate of pressure rise are selected such that the target temperature is never reached substantially before the target pressure is reached. For disks, the target temperature is at least about 1400° C., preferably about 1410° C. The target pressure is at least about 2000 psi (about 13 MPa), preferably about 2200 psi (about 15 MPa). For domes, the target temperature is at least about 1395° C. and preferably about 1460° C., and the target pressure is at least about 2000 psi (about 13 MPa), preferably about 3200 psi (about 22 MPa). A temperature which is too high will result in a substantial amount of sublimation of the spinel. A temperature which is too low may result in decreased transparency of the product. Pressures higher than the target pressure are believed to be operable but cause excessive wear of the dies. Pressures lower than the target pressure result in compaction less than that desired and inferior optical clarity. During hot pressing, the spinel normally loses about 3 ½ weight percent to sublimation.

The spinel is held at the target pressure and temperature for a period of time. The period of time for disks is about 2 to 5 hours. The period of time for domes is about 4 hours.

Following holding at the target temperature and pressure, the heating and pressure are reduced. Cooling occurs in about 12 to 14 hours. When domes are being pressed, after the die has cooled to about 1000° C., it is preferred to reduce the vacuum and to fill the die with a noble gas such as argon.

Another method for producing a closed porosity body is by pressureless sintering. Pressureless sintering, as opposed to a hot press process, permits easier control of grain growth during the closed porosity formation step, and is more useful in formation of parts having complex geometry. According to this method, the spinel powder is mixed with an amount of binder such as about 5 weight percent of carbowax, and may optionally also be mixed with materials such as surfactants, or lubricants, such as neofat. The powder mix is then compressed at substantially room temperature or is slip cast at room temperature to produce a green body. The green body is then exposed to a temperature, such as greater than about 1800° C. preferably at substantially sub-atmospheric pressure, e.g., about 100 psi (0.7 MPa). The atmosphere during said pressureless sintering can be hydrogen or vacuum.

The closed porosity body typically has some amount of residual porosity. The hot pressed body typically has a porosity of about 0.01 volume percent or more. The pressureless sintered body typically has porosity of about 1 volume percent or more. In order to produce a body with the desired characteristics, the body is subjected to a second treatment step to reduce or eliminate the residual porosity. According to the present invention, the second step is a hot isostatic pressure treatment. The closed-porosity bodies are preferably inspected for visually-apparent defects and for minimum ultraviolet transmission such as about 65–85 percent transmission of an ultraviolet source having an intensity peak at a wavelength of about 0.25 microns. The parts, preferably separated by graphite spacers, are loaded into a hot-isostatic pressing chamber. The hot isostatic treatment includes heating the body to a target temperature of about 1500° C. to 2000° C., preferably less than about 1800° C., preferably at least about 1500° C. Heating can be accomplished by a resistance heater furnace. The maximum temperature is achieved in an atmosphere which has been pressurized to at least about 15,000 psi (about 100 MPa), preferably more than 25,000 psi (about 170 MPa), and most preferably at least about 29,500 psi (about 205 MPa). The hot isostatic pressure atmosphere is preferably argon or helium. A number of rates of pressurization and heating and depressurization and cooling are operable. In one preferred embodiment, the chamber is pressurized to about 5,000 psi (about 34 MPa) without heating. The temperature and pressure are then increased linearly such that the target temperature and target pressure are arrived at essentially simultaneously. The heating is at a rate of between about 5° C. per minute and about 25° C. per minute, preferably about 15° C. per minute. The target temperature and target pressure are maintained for a period between about ½ hour and about 5 hours, preferably about 2 ½ hours. In general, there is an inverse relationship between temperature and hold time, i.e., at higher temperatures, a shorter hold time will be operable. After the hold time or "soak" period, a controlled cool-down is used. The pressure is decreased linearly during the cool-down period at such a rate that when the temperature reaches 600° C., the pressure will be about 10,000 psi (about 70 MPa). The preferred cooling rate is about 5° C. per minute down to the temperature of 600° C. Too rapid cooling, such as more than about 15° C. per minute, may cause thermal shock. After a temperature of 600° has been achieved, the furnace is turned off. The pressure, during this period, is decreased linearly at a rate such that when the temperature is 300° C., the pressure is about 7,500 psi (about 50 MPa). At this point, the pressure is allowed to freely vent to the atmosphere and the parts are allowed to cool to a temperature at which they can be handled. Normally, there will be no weight loss of the spinel parts during the hot-isostatic pressing procedure.

In one embodiment of the process, the two steps of the process are accomplished without substantial cooling of the body between steps. According to this method, a formed but unfired compact is sintered to a closed porosity state in a vessel at about atmospheric pressure in an $H_2$ atmosphere or a sub-atmospheric pressure in a vacuum atmosphere, and at a temperature of about 1400° C. Because this process does not require a hot-press step to form the closed porosity body, it can be used in formation of bodies having complex geometry. Hot press techniques are generally not suitable for forming complex geometry bodies. After the compact is sintered to a closed porosity state, the vessel is pressurized to at least about 20,000 psi (about 140 MPa), without substantial cooling of the body, at a temperature of at least about 1400° C. to accomplish the hot isostatic pressure step of the process and reduce or eliminate residual porosity of the body.

Following the hot isostatic pressing step, the body is cooled and is subjected to further steps to modify the surface characteristics of the body. These further steps can include grinding and polishing, application of an anti-reflection coating and metallizing.

Figure 1:
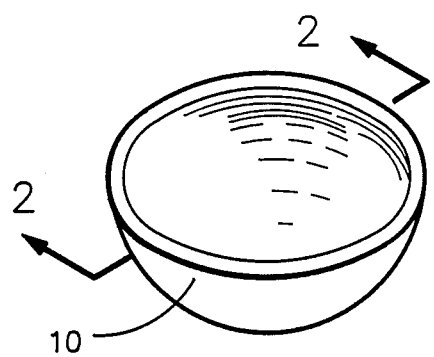
FIG. 1 is a schematic perspective view of a missile dome produced in accordance with the present invention.
Figure 2:
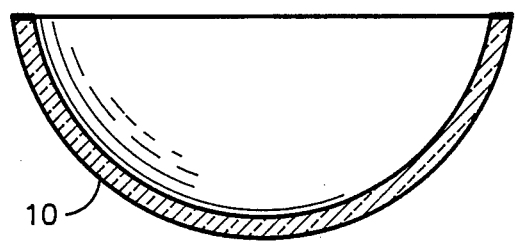
FIG. 2 is a cross-sectional view taken along Line 2—2 of FIG. 1.

The configuration, i.e., the size and shape of the body produced by the above-described process, will depend upon the particular application contemplated. Referring to FIG. 1, a dome 10 can be provided in a number of configurations. As depicted in FIGS. 1 and 2, and particularly in contemplation of use of the dome in connection with the stinger-post missile, the dome 10 is preferably in the form of a sector of a spherical shell. The outer radius of the finished dome 10 is preferably about 1.350 inches (about 33 mm) and the inner radius is preferably about 1.297 inches (about 31.7 mm) to provide a dome thickness of about 0.053 inches (about 1.3 mm).

Figure 4:
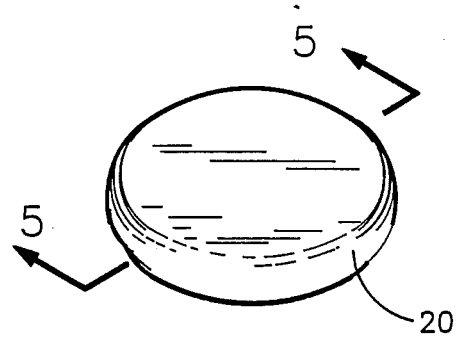
FIG. 4 is a perspective view of a launch tube window formed in accordance with the present invention.
Figure 5:
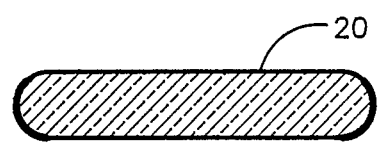
FIG. 5 is a cross-sectional view taken along Line 5—5 of FIG. 4.
Figure 3:
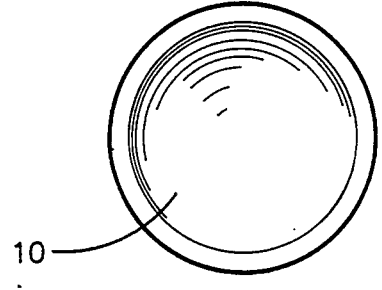
FIG. 3 is a top plan view of the dome depicted in FIG. 1.
Figure 6:
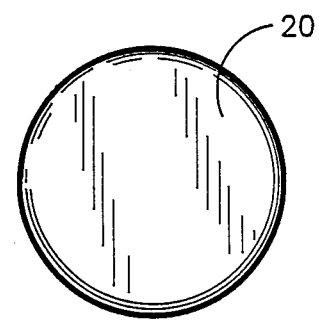
FIG. 6 is a top plan view of the launch tube window of FIG. 4.

As depicted in FIG. 4, the launch tube window is preferably 90 millimeters (3.350 inches) in diameter and 1.57 millimeters (0.064 inches) in thickness. The thickness of the window 20 is selected to provide for the desired rupturing of the window upon launch. A thicker window 20 will, in general, withstand a higher overpressure before rupturing occurs. The window 20 preferably has beveled edges as depicted in FIGS. 5 and 6.

Figure 7:
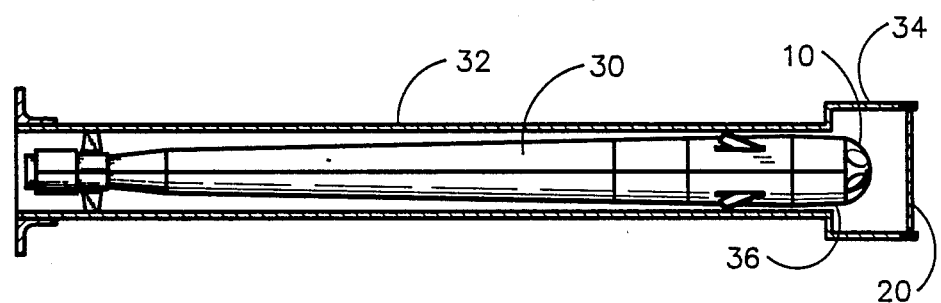
FIG. 7 is a schematic cross-sectional view of a missile having a dome and residing in a launch tube having a window.

Referring to FIG. 7, the missile 30 is provided with a dome 10 beneath which is mounted sensing instrumentation (not shown), for example, infrared and/or ultraviolet guidance or tracking sensing instrumentation. The launch tube 32 is a generally cylindrically-shaped tube sealed at both ends. The end of the launch tube 34 which is adjacent to the nose end 36 of the missile is sealed by the launch tube window 20. By using the launch tube 32 to provide a sealed environment for the missile 30, the missile components are preserved in relative cleanliness to prevent deterioration of the missile operating parts which would result from exposure to environmental contaminants. The missile 30 is intended to be launched by aiming the launch tube 32 towards the target to allow the optical guidance system of the missile to receive optical radiation from the target through both the launch tube window 20 and the missile dome 10. In connection with this launching mode, the launch tube window 20 must have transmittance properties at the ultraviolet and infrared wavelength regions in order to permit the missile guidance system to receive optical radiation while the missile is still in the launch tube.

Because the launch tube window 20 and the dome 10 are exposed to sunlight and thus to ultraviolet radiation during transport and use, the launch tube window 20 and dome 10 must retain infrared and ultraviolet transparency properties as well as strength and hardness properties under conditions of exposure to light, such as ultraviolet light.

Missile launch includes two phases. During the first phase, gases are released in the launch tube 32, producing over-pressure within the sealed launch tube sufficient to rupture the launch tube window 20. An eject motor launches the missile 30 through the nowopened end 34 of the launch tube 32. When the missile 30 is a safe distance from the gunner, a booster motor accelerates the missile to the desired speed. The missile 30 continues its flight, guided towards the intended target by the guidance system, which senses radiation through the dome 10. The dome 10 is exposed to great pressure and stress during the launch and flight owing to the acceleration of the launch, spin, abrasion by dust particles, water droplets and the like. The dome 10 produced according to this invention preserves the necessary transmittance characteristics in the face of such erosion and preserves its integrity in the face of the stress and acceleration endured during launch and flight.

EXAMPLES

Example 1

Figure 10:
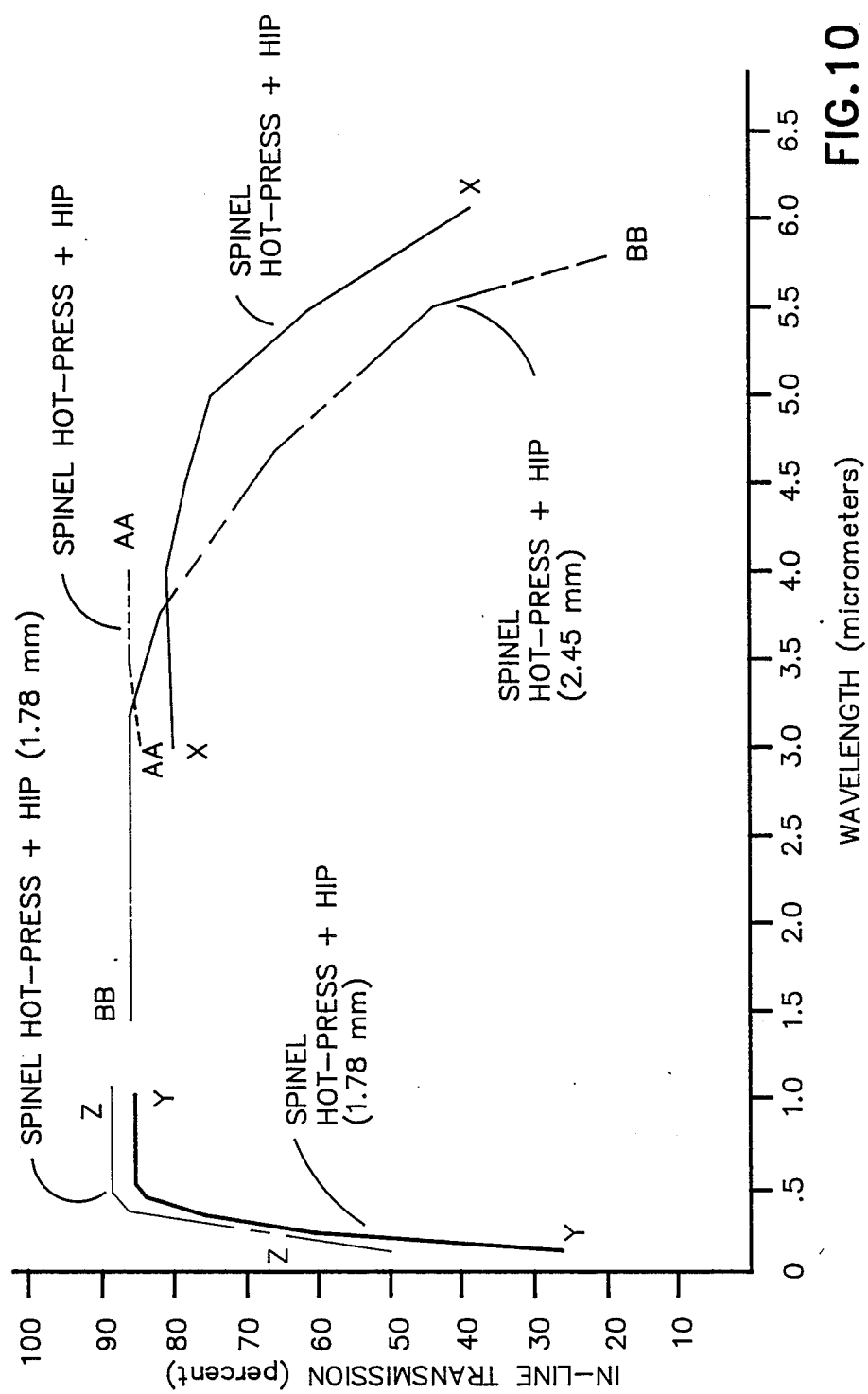
FIG. 10 illustrates spectral transmission curves of a number of samples of material made according to the present invention.

Three sintered bodies of magnesia-alumina spinel were formed and the properties thereof tested. All three bodies were formed from a powder having less than 5 parts per million by weight of oxides of any of Cr, Cu, Fe, Ga, Mn, Pb, Ti, V, and Zn and having less than 50 ppm of the total of all the above oxides. The powder had less than 1000 ppm of carbon and less than 10 ppm of calcium, less than 30 ppm sodium, less than 500 ppm sulfur, less than 1000 ppm silicon. The molar ratio of $Al_2O_3$ to MgO was 1:1. The average particle size was submicron. The powder was mixed with 1 ½ weight percent LiF. The powder was loaded in a graphite die and cold-pressed at about 100 psi (0.7 MPa). The cold-pressed body was hot pressed at a temperature of about 1410° C. with a uniaxial pressure of about 2200 psi (about 15 MPa) with a "soak" of 5 hours. After cooling, the bodies were hot isostatically pressed at a temperature of 1500° C. and a pressure of 29,500 psi. After cooling, the bodies were polished. The transmission spectrum characteristic of the three bodies is shown in FIG. 10.

Example 2

Bodies of calcium aluminate glass and bodies of spinel, the latter formed according to the process of the invention, as described in Example 1, were subjected to sunlight and an artificial ultraviolet light source for periods of time indicated in Table 3. The transmission of the bodies at a wavelength of about 0.254 microns is also shown in Table 3 before such exposure to ultraviolet light and after such exposure to ultraviolet light.

TABLE 3

| Type of Body | Light Source | Transmission Before U.V. Exposure | Transmission After U.V. Exposure | Period of Exposure |
|---|---|---|---|---|
| Calcium-aluminate glass | Sunlight | 70 | 45 | 2 hr. |
| | Artificial* | 70 | 68 | ¼ hr. |
| Spinel | Sunlight | 78 | 78 | 244 hr. |
| | Artificial* | 78 | 76 | 115 hr. |

Example 3

To assess the damage from sand erosion, samples of material formed according to the present invention, along with plexiglass and window glass were mounted on a rotating table and blasted with 10 pounds of abrasive grit. The percent haze after the test was measured using an integrating sphere. The results are shown in Table 4.

TABLE 4

| Material | Percent Haze After Sandblast Test |
|---|---|
| Spinel - Hot press + HIP | 8 |
| Plexiglass - 1 | 79 |
| Plexiglass - 2 | 74 |
| Window Glass | 82 |

Example 4

The Agile Rain Erosion Test, as described in Memo REG. 4062-137-72 "Rain Erosion Test of Proposed Dome Materials" was performed on the material produced according to the present invention as well as a number of other materials including $MgF_2$, $CaF_2$, Yttrium-Aluminum-Garnet, MgO, and two glasses, Vycor 7913 and Corning 1723. The materials were placed in a sample holder and attached to an accelerated sled achieving the velocities indicated in Table 5. Results of the test are shown in Table 5. Table 6 shows the resistance to damage of the materials tested in order of relative effectiveness.

TABLE 5

| Material | Thickness of $Al_2O_3$ Coating (microns) | Run No. | Velocity (km per hr/fps) | Description |
|---|---|---|---|---|
| Spinel-hot-press + HIP | None | 1 | 29/1600 | No appreciable damage |
| | None | 3 | 25.5/1400 | No damage |
| | None | 4 | 29/1600 | No damage |
| $MgF_2$ | None | 1 | 29/1600 | Completely shattered |
| | None | 2 | 29/1600 | Completely shattered |
| | None | 3 | 25.5/1400 | One surface crack |
| | None | 4 | 29/1600 | Complete breakage |
| | 2.1 | 4 | 29/1600 | Surface cracks with coating deterioration |
| | 3.9 | 4 | 29/1600 | Coating slightly deteriorated |
| $CaF_2$ | None | 1 | 29/1600 | Slight pitting with surface cracks & fractures throughout although sample intact |
| | None | 2 | 29/1600 | Surface cracks with pitting |
| | None | 4 | 29/1600 | Surface cracks with slight pitting |
| | 2.1 | 4 | 29/1600 | Coating gone - slight pitting with surface cracks |
| MgO | None | 1 | 29/1600 | Surface cracks |
| | None | 2 | 29/1600 | Complete breakage |
| Sapphire | None | 2 | 29/1600 | Single line fracture |
| | None | 3 | 25.5/1400 | No damage |
| Yttrium-Aluminum-Garnet | None | 1 | 29/1600 | Single line fracture |
| | None | 3 | 25.5/1400 | No damage |
| Corning 1723 | | 2 | 29/1600 | Completely shattered |
| | | 3 | 25.5/1400 | Pitting with surface cracks |
| VyCor 7913 | | 2 | 29/1600 | Completely shattered |
| | | 3 | 25.5/1400 | Surface pitting with one surface crack |

TABLE 6

Agile Rain Erosion Test Resistance To Damage
(In Order Of Relative Effectiveness)

| 1 | Spinel; Hot-press + HIP |
|---|---|
| 2 | Sapphire |
| 3 | Yttrium-Aluminum-Garnet |
| 4 | $MgF_2$ with coating |
| 5 | $CaF_2$ with coating |
| 6 | MgO |
| 7 | $CaF_2$ |
| 8 | $MgF_2$ |
| 9 | VyCor 7913 |
| 10 | Corning 1723 |

Although the present invention has been described with reference to certain embodiments, it should be appreciated that further modifications can be effected within the spirit and scope of the invention as limited only by the appended claims.

What is claimed is:

1. A dome for a missile guidance system comprising:
a transparent, sintered polycrystalline body comprising magnesia-alumina spinel having a transmittance per 1.88 mm thickness at all wavelengths in the wavelength region between 0.4 microns and 0.5 microns of at least about 82%, having a flexural strength of at least about 20,000 psi and having a knoop hardness of at least about 1350 kg mm$^{-2}$;
said body being formed in the shape of a convex shell.

2. A dome, as claimed in claim 1, wherein:
said body is formed in the shape of a sector of a spherical shell.

3. A dome, as claimed in claim 1, wherein:
said body has a transmittance per 1.88 mm thickness at all wavelengths in the wavelength region between 0.5 microns and 1.0 microns of at least about 85%.

4. A dome, as claimed in claim 1, wherein:
said body has a transmittance per 1.88 mm thickness at all wavelengths in the wavelength region between 3 microns and 4 microns of at least about 81% and all wavelengths in the wavelength region between 4 microns and 5 microns of at least about 76%.

5. A missile launch tube window comprising:
a transparent, sintered polycrystalline body comprising magnesia-alumina spinel having a transmittance per 1.88 mm thickness at all wavelengths in the wavelength region between 0.4 microns and 0.5 microns of at least about 82%, having a flexural strength of at least about 20,000 psi and having a knoop hardness of at least about 1350 kg mm$^{-2}$;
said launch tube window being formed in the shape of a substantially flat disk.

6. A launch tube window, as claimed in claim 5, wherein:
said body has a transmittance per 1.88 mm thickness at all wavelengths in the wavelength range between 0.5 microns and 1.0 microns of at least about 85%.

7. A launch tube window, as claimed in claim 5, wherein:
said body has a transmittance per 1.88 mm thickness at all wavelengths in the wavelength range between 3.0 microns and 4.0 microns of at least about 81%, and at all wavelengths in the wavelength region between 4 microns and 5 microns of at least about 76%.

8. A launch tube window, as claimed in claim 5, wherein:
said window has a thickness such that said window ruptures upon exposure to a pressure of more than about 25 psi.

9. A guided missile comprising:
a missile propulsion system for moving the missile in a controllable direction;
an optical guidance system operably connected to said propulsion system for controlling said direction of said movement;
a dome covering at least a portion of said optical guidance system, the dome comprising a transparent, sintered polycrystalline body comprising magnesia-alumina spinel, having a transmittance per 1.88 mm thickness at all wavelengths in the wavelength region between 0.4 microns and 0.5 microns of at least about 82%, at all wavelengths in the wavelength range between 3.0 microns and 4.0 microns of at least about 81%, and at all wavelengths in the wavelength range between 4 microns and 5 microns of at least about 76%, having a flexural strength of at least about 20,000 psi and having a knoop hardness of at least about 1350 kg mm$^{-2}$.

10. A missile launch tube comprising:
a tubular-shaped member having a sealable opening;
a window attached to said tubular member in a position to seal said sealable opening, said window comprising a transparent, sintered polycrystalline body comprising magnesia-alumina spinel, having a transmittance per 1.88 mm thickness at all wavelengths in the wavelength region between 0.4 microns and 0.5 microns of at least about 82%, at all wavelengths in the wavelength range between 3.0 microns and 4.0 microns of at least about 81%, and at all wavelengths in the wavelength range between 4 microns and 5 microns of at least about 76%, having a flexural strength of at least about 20,000 psi and having a knoop hardness of at least about 1350 kg mm$^{-2}$.

* * * * *

UNITED STATES PATENT AND TRADEMARK OFFICE
CERTIFICATE OF CORRECTION

PATENT NO. : 4,930,731

DATED : June 5, 1990

INVENTOR(S) : Donald W. Roy, et al

It is certified that error appears in the above-identified patent and that said Letters Patent is hereby corrected as shown below:

Page 3, line 4, "Other Publications" section, delete "Alumna" and insert therefor --Alumina--.

Column 1, line 43, insert a period after "second".

Column 2, line 6, delete "768,990" and insert therefor --3,768,990--.

Column 7, line 37, delete "cylindricallyshaped" and insert therefor --cylindrically-shaped--.

Column 10, line 6, after "window" insert --20--.

Column 10, line 49, delete "nowopened" and insert therefor --now-opened--.

Column 11, Table 3, delete "gIass" and insert therefor --glass--.

Signed and Sealed this

Eighteenth Day of June, 1991

*Attest:*

*Attesting Officer*

HARRY F. MANBECK, JR.

*Commissioner of Patents and Trademarks*